Patented Mar. 14, 1933

1,901,048

UNITED STATES PATENT OFFICE

SAMUEL VON ALLMEN, OF BASEL, SWITZERLAND, ASSIGNOR TO CHEMICAL WORKS FORMERLY SANDOZ, OF BASEL, SWITZERLAND

PREPARATION OF NEW DYESTUFFS OF THE ANTHRAQUINONE SERIES

No Drawing. Application filed September 22, 1930, Serial No. 483,753, and in Germany October 4, 1929.

It is known that the introduction of one or several arylamino groups in the α-position of the anthraquinone residue yields very intensive colored compounds which are in form of their sulphonic acids well known wool-dyestuffs. According to the number and to the position of the arylamino groups and other substituents these dyestuffs dye wool from an acid bath red, violet blue and green pure shades, which possess excellent properties of fastness. But until now it was not possible to prepare dyestuffs belonging to these series, which would yield grey shades of good fastness.

It has now been found that the dyestuffs of the general formula:

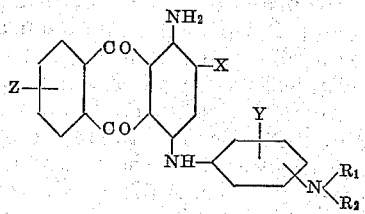

wherein X represents a halogen or a sulphonic group, Y represents hydrogen, alkyl or a sulphonic group, Z represents a halogen, a sulphonic group or a phenylene-diamine residue, and $R_1$ and $R_2$ represent hydrogen or an alkyl group, dye wool from an acid bath grey, bluish-grey and greenish-grey shades of excellent fastnesses. The dyeings thus obtained possess further the property of being transformed into pure grey shades by an after-treatment with chromates or bichromates. This course of the reaction was really unexpected as no hydroxylic groups are present, which could conduct to the production of chromium lakes.

The new dyestuffs can be obtained by heating 1 aminoanthraquinone derivatives of the general formula:

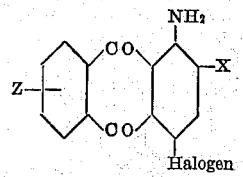

wherein X represents a halogen or a sulphonic group and Z a halogen or a sulphonic group, with phenylenediamines, their homologues and derivatives in presence of copper and copper compounds and acid binding compounds. If necessary, the thus obtained condensation products can be sulphonated by known methods.

The improved process is illustrated by the following examples, the parts being by weight.

*Example 1*

5 parts of 1-amino-2:4-dibromo-5-chloroanthraquinone are heated to 120° C. in an indifferent atmosphere with 10 parts of p-phenylenediamine, 30 parts of dimethylaniline in presence of 3 parts of potassium acetate and 0,1 parts of copper sulphate until the halogen atom linked to the position 4- of the anthraquinone derivatives has completely reacted with the p-phenylenediamine. The dyestuff base isolated therefrom yields after sulphonation a dyestuff which dyes unmordanted wool a green-grey shade, this shade being transformed by an afterchroming operation into a very fast greenish-grey tint.

*Example 2*

If in the Example 1 the temperature of melting is increased to 150–160° C., the chlorine-atom in the position 5- is also replaced by a p-phenylenediamine residue. The dyestuff base thus produced yields after sulphonation a dyestuff dyeing wool blue-grey shades, which are transformed by afterchroming into a very pure grey.

*Example 3*

23 parts of the potassium salt of 1-amino-2:4-dibromoanthraquinone-8-sulphonic acid, 250 parts of water, 8 parts of p-phenylenediamine, 6 parts of sodium carbonate and 1,5 parts of crystallized copper sulphate are heated until the bromium in the position 4 has completely reacted. The thus obtained sulphonic acid of the dyestuff is precipitated by an addition of acid and transformed into its disulphonic acid by heating it with potassium sulphite. The dyestuff isolated by salting out yields on unmordanted wool greenish-grey dyeings which are transformed by an afterchroming into bluish-grey shades,

Example 4

A similar dyestuff is obtained, if in example 3 instead of the 1-amino-2:4-dibromoanthraquinone-8-sulphonic acid the isomer 1-amino-2:4-dibromoanthraquinone-5-sulphonic acid in form of its potassium salt is used.

Example 5

20 parts of the potassium salt of 1-amino-2:4-dibromoanthraquinone-5-sulphonic acid, 300 parts of water, 5 parts of anhydrous sodium carbonate, 3 parts of crystallized copper sulphate and 10 parts of metatoluylenediamine are heated to 60–70° C. in an indifferent atmosphere, until the condensation is completely finished. The condensation product is then separated and sulphonated by means of sulphite in the usual manner. The dyestuff thus obtained has excellent levelling properties and dyes wool from an acid bath bluish-grey shades, which become gray after treatment with bichromate.

Example 6

10 parts of the potassium salt of 1-amino-2:4-dibromoanthraquinone-8-sulphonic acid, 100 parts of water, 2,5 parts of anhydrous sodium carbonate, 1,5 parts of crystallized copper sulphate and 4 parts of o-phenylenediamine are heated to 60–70° C. in an inert atmosphere until the reaction is finished, whereupon the condensation product is treated as described in Example 4. The dyestuff thus obtained dyes wool bluish-grey shades, which become grey when being afterchromed.

Example 7

If in the Example 6 the o-phenylene-diamine is replaced by dimethyl-p-phenylenediamine, the dyestuff thus obtained dyes wool dull blue shades which become bluish-grey on after-chroming. This dyestuff possesses good fastness to light and good levelling properties.

Example 8

If in the Example 6 the o-phenylene-diamine is replaced by diethyl-p-phenylenediamine, the dyestuff thus obtained dyes wool blue shades, which become violet-grey if treated with bichromate and acid. This dyestuff possesses good fastness to light and good levelling properties.

The reactions of the dyestuffs above obtained are the following:

| Dyestuff | Aspect | Solution in water | +HCl | Solution in $H_2SO_4$ | +B(OH)$_3$ | Solution in cold alcohol |
|---|---|---|---|---|---|---|
| Example 1 | Greenish-black powder | Green-blue | Precipitates | Blue | Green-blue, red fluorescence | Blue-green |
| Example 2 | Blue-black powder | Blue | Red-violet | Violetish-blue | Blue; red fluorescence | Green-blue, little soluble |
| Example 3 | Violetish-black powder | Greenish-blue | Dull red | Grey | Blue | Very little soluble, blue-green |
| Example 4 | Black powder | Dull violet | Precipitates | Violetish-grey | Blue-grey | Insoluble |
| Example 5 | Bluish-black powder | Blue | Violetish-red | Brownish-red | Dirty greenish-blue | Blue, little soluble |
| Example 6 | Black powder | Dirty violet | Dirty violet | Olive | Green | Insoluble |
| Example 7 | Black powder | Pure blue | Violetish-red | Dull, very pale violet | Dull blue | Bluish-green, little soluble |
| Example 8 | Bluish-black powder | Blue | Reddish-violet | Incolorous | Dull blue | Greenish-blue |

What I claim is:

1. The dyestuffs of the general formula:

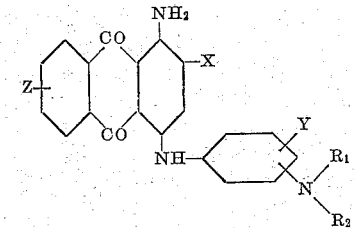

wherein X represents a halogen or a $SO_3H$-group, Y represents hydrogen, an alkyl or a $SO_3H$-group, Z represents a halogen, a $SO_3H$-group or a phenylenediamine group, and $R_1$ and $R_2$ represent hydrogen or an alkyl group, which are in dry state dark powders, dissolving in water with a blue to violet coloration and dyeing wool from an acid bath bluish-grey to greenish-grey shades which may be afterchromed yielding pure grey tints.

2. The dyestuffs of the formula:

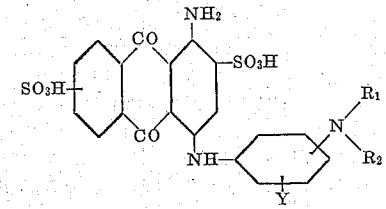

wherein Y represents hydrogen or an alkyl group and $R_1$ and $R_2$ represent hydrogen or an alkyl group, which are in dry state dark powders, dissolving in water with a blue coloration and dyeing wool from an acid bath from blue to greenish-grey tints which become grey on afterchroming.

3. The dyestuff of the formula:

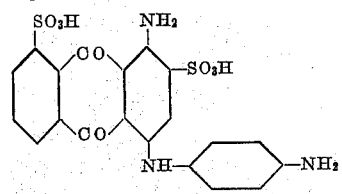

which constitutes in dry state a dark black-violet powder, soluble in water with a greenish-blue coloration and in sulphonic acid with a grey coloration, which turns to blue on addition of boric acid, said dyestuff dying wool from an acid bath greenish-grey shades which become bluish-grey when being afterchromed.

4. The dyestuff of the formula:

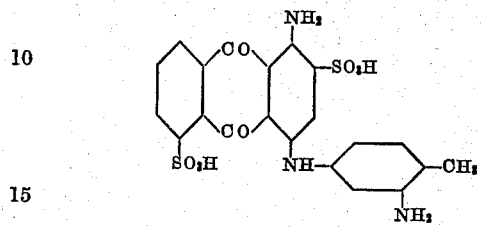

which constitutes in dry state a dark blue black powder, soluble in water with a blue coloration and in sulphonic acid with a red-brown coloration which turns to dull greenish-blue on addition of boric acid, said dyestuff dyeing wool from an acid bath bluish-grey shades which become grey when being afterchromed.

5. The dyestuff of the formula:

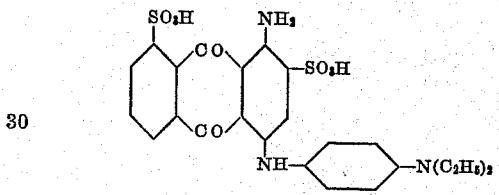

which constitutes in dry state a dark blue black powder soluble in water with a blue coloration and without coloration in sulphuric acid, the solution becoming dull blue on addition of boric acid, said dyestuff dyeing wool from an acid bath blue shades which become violet-grey when being afterchromed.

In witness whereof I have hereunto signed my name this 12th day of September, 1930.

SAMUEL von ALLMEN.